United States Patent
Allison et al.

[11] Patent Number: 5,812,729
[45] Date of Patent: Sep. 22, 1998

[54] VERY HIGH NUMERICAL APERTURE LIGHT TRANSMITTING DEVICE

[75] Inventors: Stephen W. Allison, Knoxville; Lynn A. Boatner, Oak Ridge; Brian C. Sales, Knoxville, all of Tenn.

[73] Assignee: Lockheed Martin Energy Systems, Inc., Oak Ridge, Tenn.

[21] Appl. No.: 505,422

[22] Filed: Jul. 21, 1995

[51] Int. Cl.[6] ................................................ G02B 6/16
[52] U.S. Cl. .......................... 385/142; 385/144; 385/123
[58] Field of Search ................................. 365/123, 141, 365/142, 144; 501/37, 45

[56] References Cited

U.S. PATENT DOCUMENTS

| | | | |
|---|---|---|---|
| 4,110,002 | 8/1978 | Klein et al. | 385/142 |
| 4,305,757 | 12/1981 | Yamashita | 501/78 |
| 4,476,233 | 10/1984 | Kodama | 501/46 |
| 4,484,950 | 11/1984 | Hinkebein | 106/287.29 |
| 4,699,889 | 10/1987 | Sales et al. | 501/22 |
| 4,871,230 | 10/1989 | Yamashita et al. | 385/123 |
| 5,526,369 | 6/1996 | Hayden et al. | 372/40 |

*Primary Examiner*—John D. Lee
*Assistant Examiner*—Ellen Eunjoo Kang
*Attorney, Agent, or Firm*—George L. Craig

[57] ABSTRACT

A new light-transmitting device using a SCIN glass core and a novel calcium sodium cladding has been developed. The very high index of refraction, radiation hardness, similar solubility for rare earths and similar melt and viscosity characteristics of core and cladding materials makes them attractive for several applications such as high-numerical-aperture optical fibers and specialty lenses. Optical fibers up to 60 m in length have been drawn, and several simple lenses have been designed, ground, and polished. Preliminary results on the ability to directly cast optical components of lead-indium phosphate glass are also discussed as well as the suitability of these glasses as a host medium for rare-earth ion lasers and amplifiers.

2 Claims, 7 Drawing Sheets

Illustration Of Input Numerical Aperture

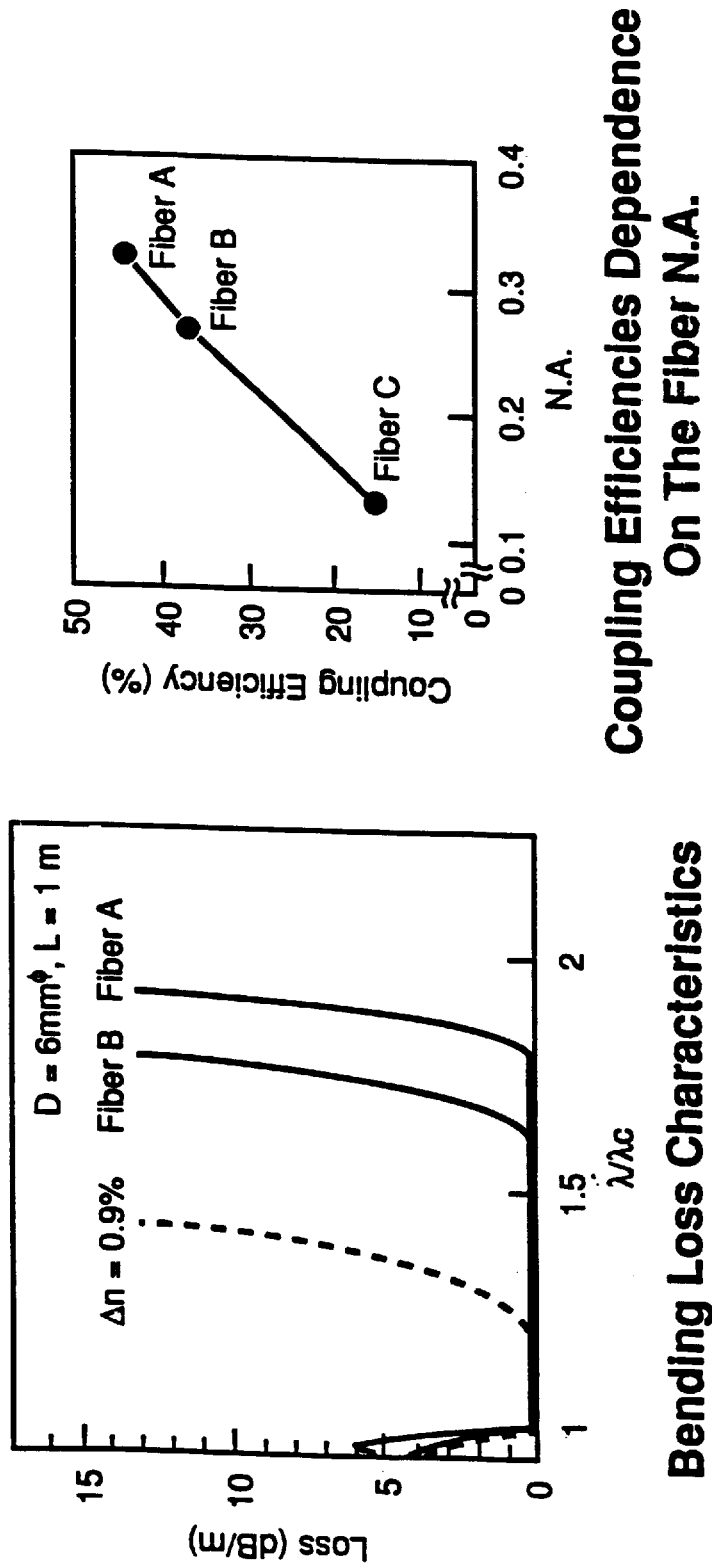

VERY HIGH NUMERICAL APERTURE LIGHT TRANSMITTING DEVICE

This invention was made with Government support under contract DE-AC05-84OR21400 awarded by the U.S. Department of Energy to Martin Marietta Energy Systems, Inc. and the Government has certain rights in this Invention.

FIELD OF THE INVENTION

The present invention relates to a very high numerical aperture (VHNA) light transmitting device. More particularly, the invention relates to VHNA optical fibers and light pipes having a glass core and a glass cladding. Most particularly, the invention relates to VHNA optical fibers and light pipes having a lead-indium phosphate or lead-scandium phosphate core and a calcium sodium phosphate cladding.

BACKGROUND OF THE INVENTION

The low preparation temperatures and low softening points of lead phosphate glasses have made them ideal materials for fundamental studies of the glass transition and devitrification phenomena and previous investigations have found the addition of iron oxide ($Fe_3+$) to a lead phosphate melt results in a dramatic improvement in the chemical durability of the resulting glass without significantly raising either the preparation temperature or the melt viscosity. The structural and chemical characteristics of these glasses were investigated in great detail within the context of a new storage medium for high-level nuclear waste. The iron in these lead-iron phosphate glasses, however, renders them opaque for wavelengths in the visible region. Boatner and Sales, however, in U.S. Pat. No. 4,699,899, found that when $In_2O_3$ (or $Sc_2O_3$) was substituted for $Fe_2O_3$ in a lead phosphate melt that an optically clear and durable lead-indium (lead-scandium) phosphate (SCIN) glass resulted. The $In^{3+}$ ions (and $Sc^{3+}$ ions), like $Fe^{3+}$ ions, tend to effectively cross-link the short $PO_4$ chains which results in the formation of relatively small channels that impede the diffusion of water into the glass structure thereby increasing the chemical durability yet providing a new SCIN glass usable for light transmitting applications and possessing a large index of refraction which is essential to the fabrication of VHNA light transmitting devices.

New optical fibers have been recently developed by Allison, Boatner, and Sales using as core material the SCIN glass and cladding materials of silicone-polymer plastic optical polymer, optical epoxy, silicone or other transparent organic material. Although these fibers have optical properties suitable for many applications, plastic-clad fibers are more susceptible to structural and environmental damage, must operate at lower temperatures, have lower laser-damage thresholds and have greater coupling difficulties. Glass-clad fibers avoid these limitations and also have superior optical properties because of a well-defined and mechanically-tough core-glass/cladding-glass interface. Because of the unusual thermal, chemical, and optical properties of the SCIN core glass however, no known commercial glass is suitable for use as the glass cladding.

The cone of acceptance for light entering an optical fiber is determined by a parameter called the numerical aperture (NA). Communication fibers are designed to minimize the numerical aperture and typically have NA values of 0.12. However, many light sensing and light-delivery applications would benefit from an optical fiber with a maximized NA. Such a fiber would collect light from a wider field-of-view. Light sources such as light-emitting diodes, highly divergent lasers (e.g. laser diodes), and other diffuse sources are more efficiently coupled into and transmitted by an HNA optical fiber. The theoretical value of the numerical aperture is obtained from the following relation: $NA=(n_c^2 - na_{cl}^2)^{1/2}$ where nc is the index of the fiber core and nc is the index of the cladding. The maximum possible value for the NA is 1 which means that all of the non-reflected light that impinges directly on the core class is coupled into the fiber, regardless of the angle of incidence. .

The present invention overcomes the limitations of conventional clad light pipes and optical fibers by providing a novel cladding glass that can be used with the SCIN core glass to produce an all glass VHNA light-transmitting device. Additionally, a paper by Sudo et al in Applied Optics, Vol. 29(12), 20 April 1990, lists some advantages of single-mode HNA light-transmitting devices. The highest NA reported was less than 0.4 which is considerably less than that provided by the fiber of the present invention. Finally, although conventional HNA fibers do not transmit very well past about 850 nm, devices made according to the present invention may transmit well to approximately 3 $\mu$m.

OBJECTS OF THE INVENTION

Accordingly, it is an object of the present invention to provide a novel light transmitting device having a glass core and a glans cladding thereon. A further object of invention is to provide a method for making a novel glass composition suitable for cladding light transmitting devices. Further and other objects of the present invention will become apparent from the description contained herein.

SUMMARY OF THE INVENTION

In accordance with one aspect of the present invention, a new and improved light transmitting devices comprises: 1 at least one linear core material formed from a first glass composition having a first high index of refraction and a first linear thermal expansion coefficient and consisting essentially of lead oxide, phosphorus pentoxide and a third oxide selected from the group consisting of indium oxide or scandium oxide; and (b) a cladding material formed about each one of said linear core material from a second glass composition having a second index of refraction lower than said first index of refraction and a second linear thermal expansion coefficient approximately matching said first linear thermal expansion coefficient.

BRIEF DESCRIPTION OF THE DRAWINGS

In the drawings:

FIG. 7A illustrates the relationship between bending loss and wavelength for HNA optical fibers.

FIG. 7B illustrates the relationship between coupling efficiency and numerical aperture for HNA optical fibers.

Figure 1:
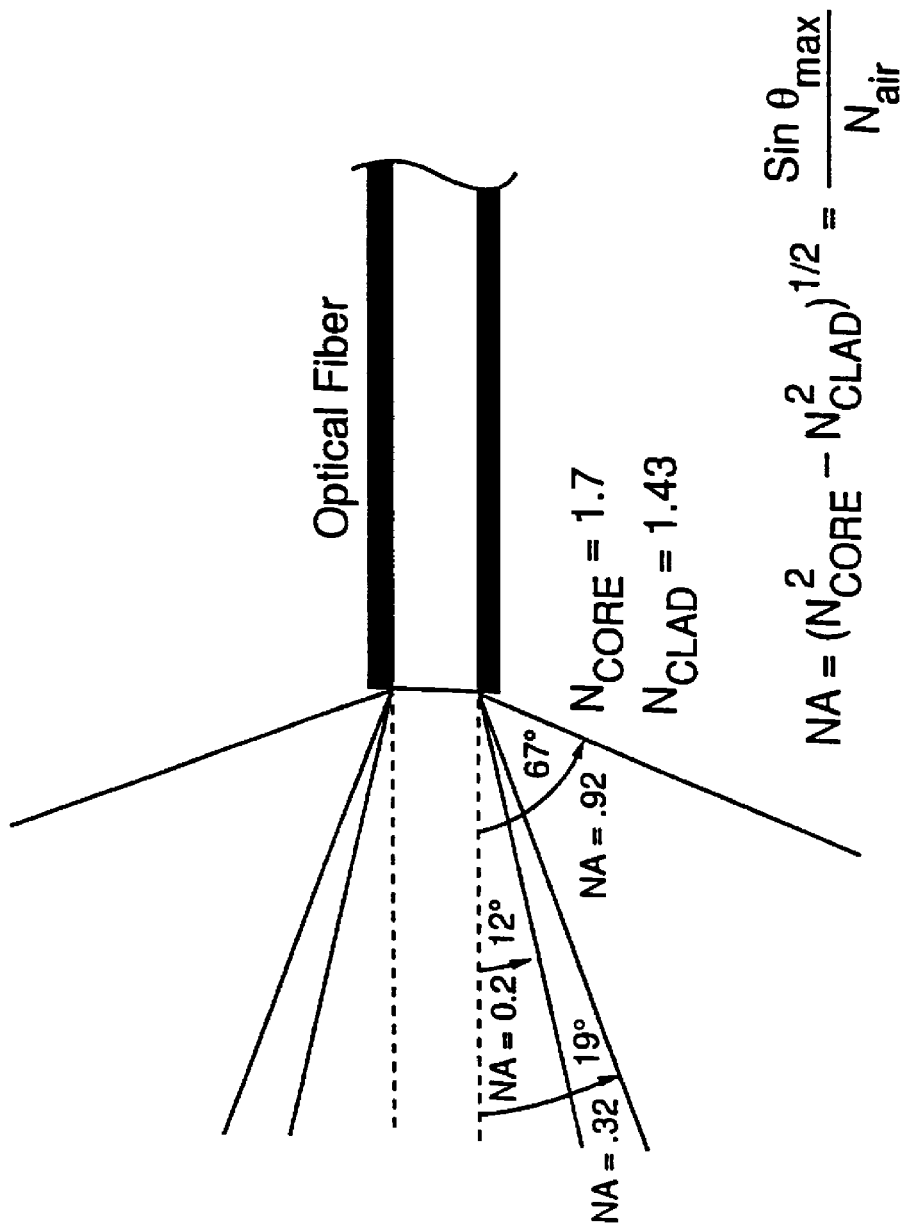
FIG. 1 illustrates a VHNA optical fiber in accordance with the present invention.

For a better understanding of the present invention, together with other and further objects, advantages and capabilities thereof, reference is made to the following disclosure and appended claims in connection with the above described drawings.

DETAILED DESCRIPTION OF THE PREFERRED EMBODIMENTS

A principal advantage of SCIN glass in the development of VHNA light transmitting devices is the structure of the glass itself. For example, lead-indium phosphate glasses consist of chains of corner-inked $PO_4$ tetrahedra. Neighboring polyphosphate chains are linked by cross bonding between the metal cations (i.e., Pb, In) and the non-bonding oxygen of each $PO_4$ tetrahedron. "In-chain" P-O-P bonds between PQ tetrahedra are generally stronger than the cross bonding between chains via the metal cations. The addition of $In_2O_3$ to a lead phosphate glass, however, greatly strengthens the cross-bonding. The distribution of phosphate chains in the lead-indium-phosphate glass was measured using the technique of high-performance liquid chromatography. The percentage of phorus in each phosphate chain (anion) was found to be as follows: 12% P1, 48% P2, 26% P3, 10% P4, 3% P5, 1% P6, where Pi means a corner-linked phosphate chain consisting of i $PO_4$ tetrahedra. This type of glass structure is significantly different from that of most conventional silicate glasses. Such glasses tend to have large "molecules" of $SiO_4$ tetrahedra that form an extended skeleton-like structure with many of the $SiO_4$ tetrahedra directly corner-linked to 3 or 4 neighboring SiQ tetrahedra. This dfference in structure between a lead-indium-phosphate glass and a typical silicate glass produces two advantages over conventional silicate glasses.

A first advantage is that, for temperatures above the glass transition, the viscosity of the phosphate glass decreases much more rapidly with temperature resulting in a liquid that can be easily poured at moderate temperatures (800°–900° C.). A low viscosity at moderate temperatures indicates the possibility of directly pouring optical components of lead-indium phosphate glass. For example, molten lead-indium-phosphate glass at a temperature of about 900° C. was poured into a hemispherical silica mold with polished surfaces to cast a near-net-shape optical lens. The glass was annealed for one hour at 420° C. and cooled to room temperature over several hours. There was a slight reaction between the silica mold and the lead-indium phosphate glass at the liquid-air interface, but no detectable reaction between the curved surface of the silica mold and the molten-phosphate glass. The hemispherical surface of the cast phosphate glass was of good optical smoothness and replicated the degree of polish on the silica mold.

A second advantage is that since the melt viscosity is very low, during cooling, the relatively short phosphate chains can adjust to create a more homogenous local environment for optically active metal cations such as the rare earths (e.g. Nd, Er, Pr). A more homogeneous local environment (such as is found in a crystal) typically results in more efficient lasing and amplification properties. Similar structural advantages occur with lead-scandium phosphate glasses.

Certain advantageous optical properties are also found in the use of SCIN glass for VHNA light-transmitting devices. Again using lead-indium phosphate by way of example and not limitation, the optical transmission versus wavelength was measured on a polished bar of lead-indium phosphate glass 2.7 cm thick. The ultraviolet absorption edge was located at approximately 300 nm (33000 $cm^{-1}$). The glass began to absorb noticeably in the infrared near 1600 nm and was optically opaque at 2900 nm (3475 $cm^{-1}$). In the region between 350 and 1600 nm (inclusive of the wavelength range of visible light), no absorption bands were observed and no significant absorption was found within the limitation of this type of measurement. The index of refraction of the glass was measured using the method of minimum deviation as well as using spectroscopic ellipsometry. Good agreement was found between the two techniques with the ellipsometry method providing more precise values for the optical functions. The refractive index of the glass varies from 1.80 at 620 nm to 1.93 at 310 nm, with an Abbe number of 32.4. The "browning" characteristics of the glass also were investigated by exposing polished slices to intense gamma-radiation from a $^{60}Co$ source ($10^6$ R/h) for a period of three weeks. Upon removing the exposed slices from the gamma source, the glass showed an amber color that gradually disappeared when the slices were exposed to normal light and room temperatures. Most of the amber coloration disappeared at room temperature during the first few hours. There appeared to be some radiation-induced absorption, however, that could only be removed by heating the glass to about 150° C. for a few minutes.

FIG. 1 is an illustration of input numerical aperture for an optical fiber. Communication fiber often exhibits an NA=0.12. Even a fiber having an NA of 0.32 is sometimes referred to as having a high numerical aperture.

Figure 2:
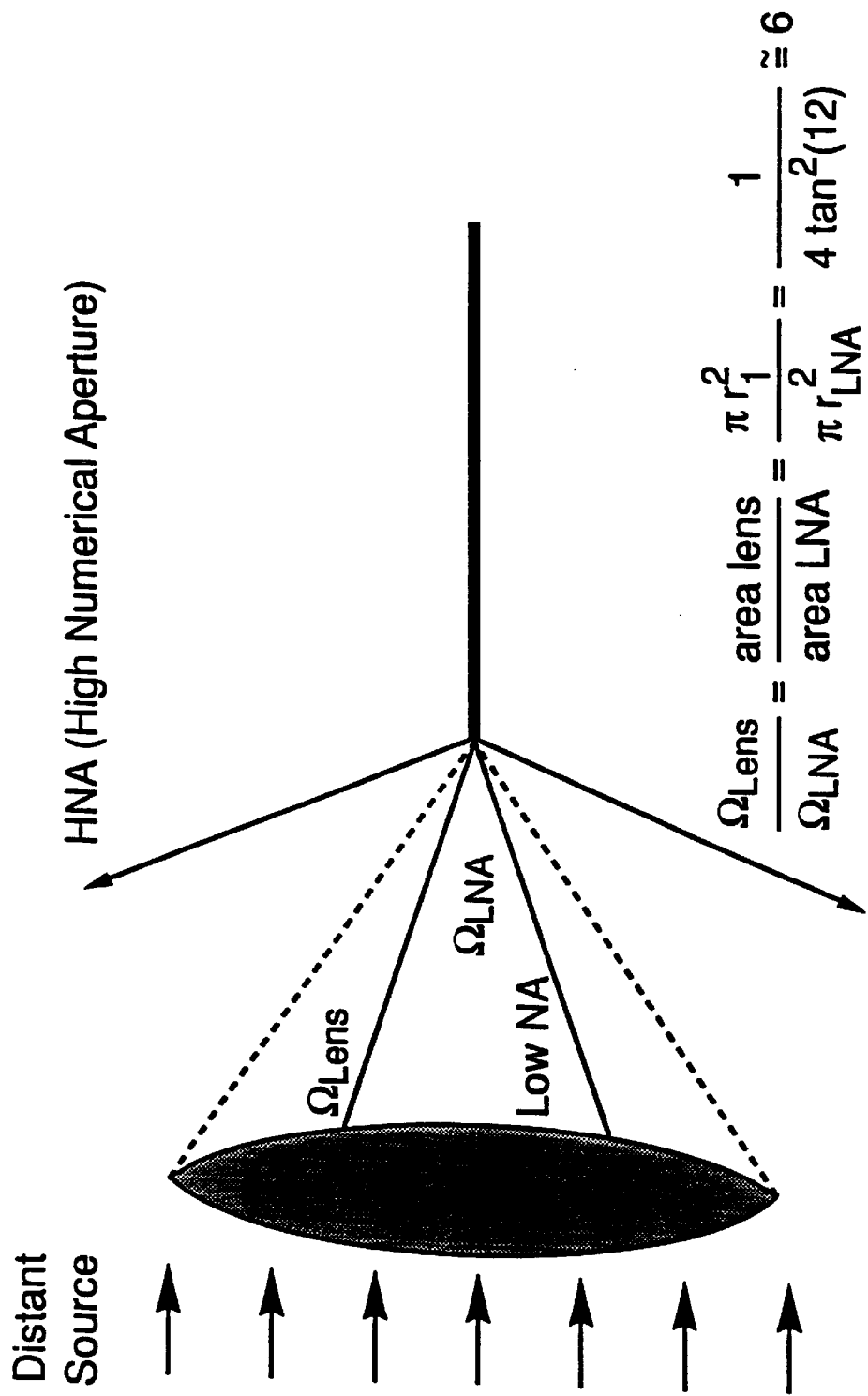
FIG. 2 illustrates the collection efficiency of a VHNA optical fiber in accordance with the present invention.

FIG. 2 illustrates how an increased NA improves the light-collecting efficiency of lens used in an optical system. Many HNA fiber applications will greatly benefit from lenses that are also characterized by a correspondingly high numerical aperture. Such lenses are needed for high-efficiency collecting, collimating, focusing and imaging light which goes into or emerges from HNA fiber. The purpose of the lens is to collect and focus collimated light (or light from a very distant source) into the fiber. In the figure, the focusing lens (assumed to be F/1) rather than the fiber NA is the limiting influence. Nonetheless, an improvement in collection efficiency of approximately 6 is obtained. Use of a faster lens will improve this efficiency. The SCIN glass is ideal for fabrication of such lenses because of its extremely high index of refraction. Further, for spherical optical elements, less curvature (with respect to more common optical materials) of lens surfaces is required for lens materials having a higher NA. The lower curvature has the advantage of introducing less spherical aberration. With respect to aspheric lens uses, the SCIN glass exhibits advantages over conventional materials because of the high index which eases curvature demands. Some advantages of using aspheric lenses in optical systems include reduction of the number of required optical elements, greater freedom in aberration correction, ability to relay beams over large distances without intervening lenses, exhibition of diffraction-limited image quality and relaxation of input light source requirements due to the high efficiency of the lens.

Fibers fabricated from sapphire would also exhibit a high numerical aperture. To date, however, high quality sapphire fibers can only be made in small diameters and without a cladding because of the high fabrication temperatures required. This material is expensive and it is unlikely that long lengths of high purity, high transmission sapphire optical fiber will be available soon.

Figure 3:
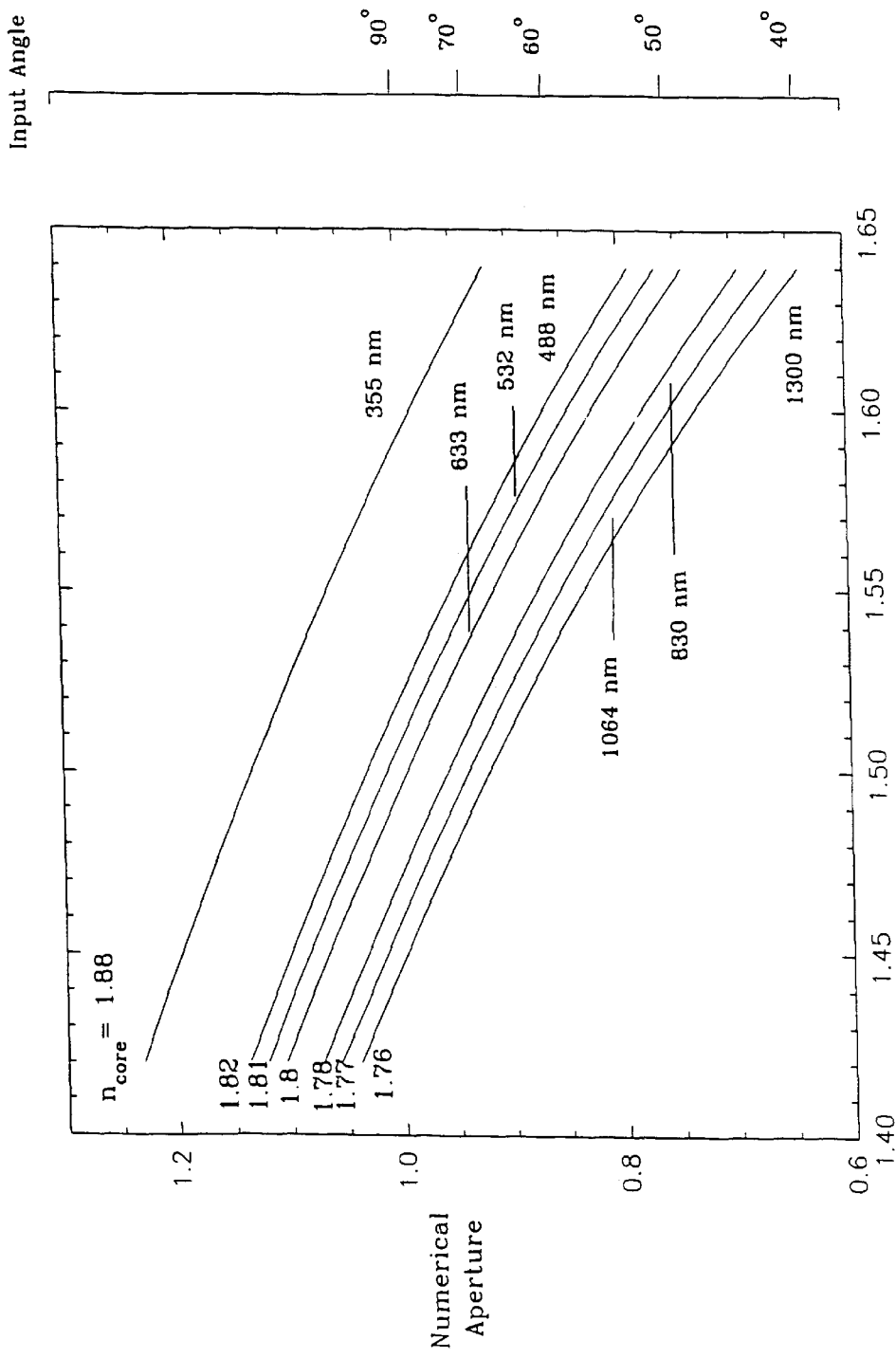
FIG. 3 illustrates the relationship of numerical aperture vs cladding index of refraction for varying core indices of refraction.
Figure 4:
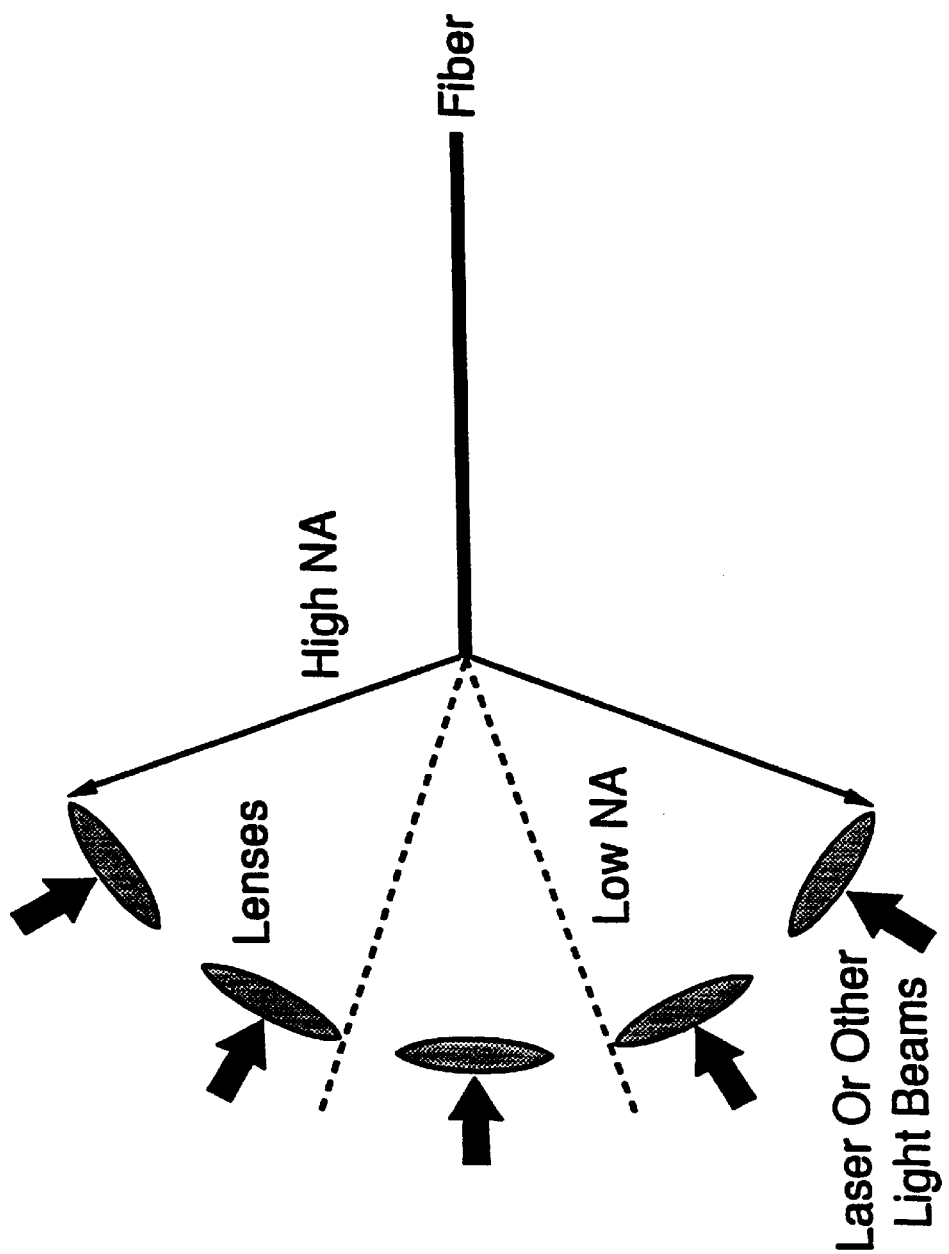
FIG. 4 illustrates laser beam multiplexing with a VHNA optical fiber in accordance with the present invention.

FIG. 3 illustrates the relationship between the index of refraction of the cladding of an optical light-transmitting device and the numerical aperture for different possible indices of refraction of the core of such a device and at different typical light-source wavelengths.

An all-glass VHNA optical fiber consists preferably of a core glass with a high index of refraction surrounded by a cladding glass with a much lower index of refraction and the cladding should have melting point and viscosity characteristics reasonably similar to the phosphate glass such as, for example, a glass transition temperature, Tg, a glass softening temperature, Ts, and a thermal expansion coefficient, $\alpha$, as closely matched to the core glass as possible. If the thermal properties of the two glasses are not closely matched, the clad-glass preform from which the clad fiber is drawn will shatter on cooling. The cladding glass must also have reasonable chemical durability when exposed to normal environmental conditions such as moisture, temperature, etc., and should form a good chemical bond with the core glass. A new calcium-sodium phosphate cladding glass satisfying all of the above requirements has been developed for use with the SCIN core glass.

The composition of the calcium-sodium phosphate cladding glass most closely matching the thermal properties of the SCIN core glass of the VHNA optical fiber of the present invention is 42±1 Mole % CaO, 10±1 Mole % $Na_2O$ and 47±1 Mole % $P_2O_4$.

This cladding glass can be made by mixing together the appropriate amounts of CaO, $Na_2O$, and $P_2O_5$, and heating to about 1050° C. in a platinum or alumina crucible. However, all of these oxides have a strong tendency to react with moisture in the air, particularly $P_2O_5$, which makes them difficult to use. A better synthesis procedure was to start with two inexpensive sodium phosphate and calcium phosphate compounds that can be purchased from several commercial sources. The two starting compounds used to make the cladding glass were $Na_2HPO_4.7H_2O$ and $Ca(HPO_4)_2$. Typically 300 gms of $Ca(HPO_4)_2$ was mixed together with 84 gms of $Na_2HPO_4.7H_2O$. The mixture was then placed in a 500 cc alumina ($Al_2O_3$) crucible and slowly heated to 970° C. (typical heating rate of about 4° C./min). During this initial heating, the two starting compounds decompose with the evolution of water. The resulting molten liquid has the composition given above. The molten liquid is allowed to homogenize for 16 hours at 970° C. and then is poured into a preheated graphite mold and annealed at 410° C. for 1 hour. The annealing furnace is then turned off and the block of cladding glass is allowed to cool to room temperature over the period of a few hours.

The thermal and optical characteristics of the calcium-sodium phosphate cladding glass are summarized in Table I and are compared to the properties of the lead-indium phosphate core glass. The softening temperatures and thermal expansion coefficients of the two glasses are sufficiently close to prevent the development of significant stress when a preform, composed of both glasses, is cooled below the softening temperature.

TABLE 1

Thermal and Optical Characteristics of Lead-Indium Phosphate Core Glass and Calcium-Sodium Phosphate Cladding Glass for a VHNA Optical Fiber-

|  | Lead-Indium Phosphate Core Glass | Calcium-Sodium Phosphate Cladding Glass |
| --- | --- | --- |
| Glass Transition Temperature | 435° C. | 415° C. |
| Dilatometric Softening Temperature | 459° C. | 458° C. |

TABLE 1-continued

Thermal and Optical Characteristics of Lead-Indium Phosphate Core Glass and Calcium-Sodium Phosphate Cladding Glass for a VHNA Optical Fiber-

|  | Lead-Indium Phosphate Core Glass | Calcium-Sodium Phosphate Cladding Glass |
| --- | --- | --- |
| Melting and Fining Temperature | 970° C. | 970° C. |
| Pouring Temperature | 1030° C. | 1030° C. |
| Coefficient of Thermal Expansion | $12.0 \times 10^{-6}$/°C. (30–350° C.) | $11.9 \times 10^{-6}$/°C. (30–350° C.) |
| Index of Refraction | 1.86–1.79 (400–800 nm) | 1.55–1.52 (400–800 nm) |
| Dispersion (Abbe number) | 30 ± 1 | 66 ± 1 |
| Density | 5.3 ± 0.1 | 2.6 ± 0.1 |

A preform is basically a thick glass rod that is used as the source material for drawing a thin fiber. Cylindrical glass rods 1.5 cm in diameter and 15 cm long are typical dimensions for the preform. With a preform of this size, several hundred meters of fiber (100–300 microns in diameter) can be drawn using a conventional draw-tower. There are several well known techniques for producing a glass-clad preform. To demonstrate the feasibility of preparing a preform with a lead-indium phosphate glass core surrounded by a tube of the calcium-sodium phosphate cladding glass, the following method was used. Pieces of the core glass and the cladding glass are loaded into separate platinum crucibles, transferred into a furnace set at 1030° C., and left to homogenize for about 1 hour. In a separate furace, a boron nitride mold is preheated to a temperature just below the glass transition temperature of both glasses (410° C.). The mold consists of a 1.5 cm diameter×15 cm long hole that is machined into a 3 cm diameter by 20 cm long boron nitride rod. The hole is machined with about a 10 taper to facilitate the removal of the annealed glass preform from the mold. The boron nitride mold is removed from the annealing furnace and tilted at an angle about 45° from vertical. The mold is initially tilted while pouring the molten glass into the mold to minimize the formation of trapped air bubbles. The platinum crucible containing the molten calcium-sodium phosphate cladding glass is removed from the furnace first and the cladding glass is poured into the tilted boron nitride mold. As the molten glass nears the top of the mold, the mold is returned to vertical. After waiting about 6 seconds, the boron nitride mold is inverted and the cladding glass that is still molten is poured back into the platinum crucible. This procedure coats the inside of the boron nitride mold with a thin layer of the cladding glass. The second platinum crucible containing the molten lead-indium phosphate core glass is then removed from the furnace and the core glass is poured, as before, into the same boron nitride mold. The mold with both the core and the cladding glass is transferred back into the annealing furnace (at 410° C.) for 1–2 hours, after which the furnace is turned off and allowed to cool to room temperature over a period of 5–8 hours. The furnace is then opened and the clad preform is removed from the mold. To reveal the sharp interface between the core and cladding glass, the calcium-sodium phosphate cladding glass can be doped with about 1 % $Nd_2O_3$ in order to give the cladding glass a blue color.

Several preforms were fabricated using the method described previously, taken to a fiber optic draw tower, and drawn into optical fibers producing over 100 m of optical fiber, having a diameter of 200 microns.

The above experiments teach that a cladding glass can be synthesized and formed whose combined physical and chemical properties meet all of the restrictive requirements that determine whether or not a material can function in concert with a core glass in order to form a glass-clad optical fiber utilizing, in this case, lead indium phosphate as the core glass material. Specifically, a unique glass composition is shown whose linear thermal expansion coefficient is sufficiently closely matched to that of a lead-indium phosphate core glass to permit the physical cladding of the core glass in a manner that prohibits the physical cracking or crazing of the cladding glass which must completely surround and encase the core glass material. Further, it is shown that it is possible to form a cladding glass whose index of refraction is sufficiently low relative to that of the core glass to prevent the loss of light from the core glass and, therefore, to permit the ensemble consisting of the core glass and surrounding cladding glass to function as a high numerical optical fiber. It is shown still further that it is possible to form a cladding glass composition whose melting point and softening point are sufficiently close to that of the core glass to permit the physical fabrication of an optical fiber preform consisting of the cladding glass and core glass from which it is possible to draw long lengths of high numerical-aperture optical fibers.

Figure 5:
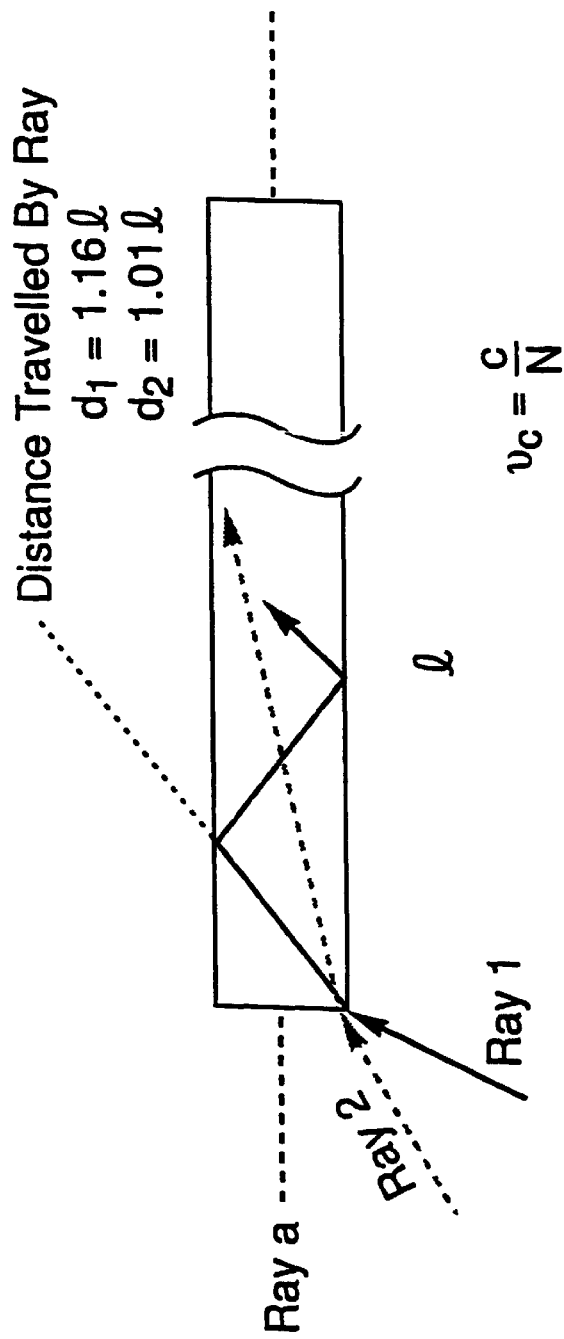
FIG. 5 illustrates time delay of different light beams having different angles of incidence in a VHNA optical fiber in accordance with the present invention.

The new phosphate glass materials from which these new VHNA fibers are fabricated have a number of characteristics which improve their utility. They are resistant to radiation thus permitting improved use in high radiation environments. They are also highly soluble for rare earths permitting applications for rare-earth doped optical fibers for amplification, switching, and generation of laser light. An illustration of the time delay capabilities of the fiber itself is shown in FIG. 5. The temporal dispersion in the VHNA fibers is very high. This illustrates that not only different light beams but also the different modes of an individual light beam inserted into the fiber will emerge at different times. The higher order modes will require much longer to traverse a given distance in the fiber than the lower order modes and this time difference, $\Delta t$, is proportional to the numerical aperture of the fiber. This feature may have application in pulse broadening, multiplexing, optical computer timing, etc.

The calcium-sodium phosphate cladding glass was specifically developed to be used with the lead-indium phosphate core glass to produce a fiber with a numerical aperture close to the theoretical limit (1). For example, a fiber composed of the lead-indium phosphate core glass and the calcium-sodium phosphate cladding glass have theoretical NA values ranging from 0.92 at 800 nm to 1 at 400 nm. Further, both the core glass and the newly developed calcium-sodium phosphate glass easily dissolve substantial quantities of rare-earth and other optically active ions. This permits the development of new lasers or fiber amplifiers since different optically active ions can be placed in the core or the cladding of the fiber. For example the cladding glass could be doped to act as an optical pump for the core glass. Further, the threshold for laser action is proportional to numerical aperture and thus fiber-optic laser amplifiers and oscillators fabricated from the subject VHNA fiber will possess certain advantages over lasers made from conventional fibers. Additionally, optically active ions can be doped into the cladding of the fiber resulting in the cladding glass acting as an optical pump for the core glass.

Figure 6:
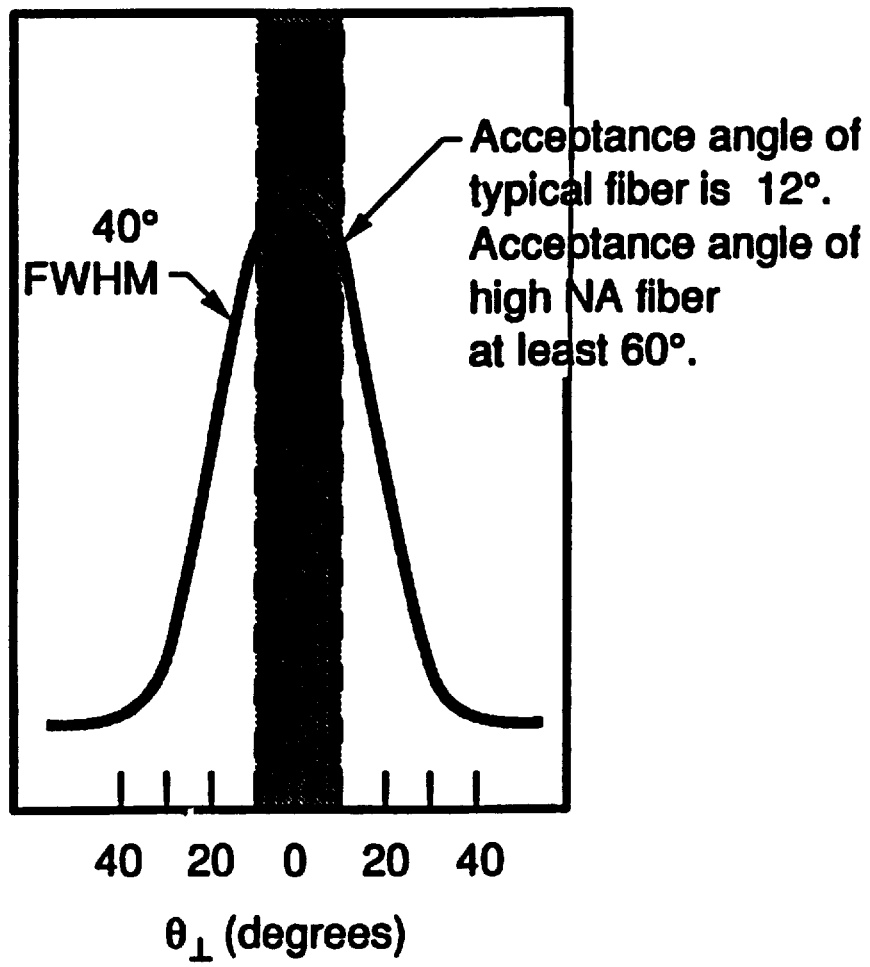
FIG. 6 illustrates the different energy distribution between conventional optical fibers and VHNA optical fibers in accordance with the present invention.

VHNA light transmitting devices made according to the present invention provide a unique capability over conventional light-transmitting devices in the transmission and/or emission of light having a large incidence angle from the optical axis of the device. While it is frequently not difficult to launch conventional, highly coherent laser light into an optical fiber, there are some laser light sources which are an exception to this rule. Semiconductor laser diodes are highly divergent and, because of the size of of the emitting area, present a demanding situation for fiber-optic coupling and beam manipulation. A high NA fiber can capture more of the emitted light than conventional low NA fiber as shown in FIG. 6.

Further, where the sensing region is in the cladding of the fiber and the process of fluorescence in the cladding indicates the presence or absence of the material to be sensed the amount of fluorescence guided increases as the numerical aperture increases. Thus the present invention will allow for improved cladding-based sensors by providing improvement in detected signal strengths.

The novel VHNA devices made according to the present invention provide the further advantage over conventional light-transmitting devices. The fraction of modes that are lost when a light transmitting fiber or rod is bent is proportional to $1/(1-n_2/n_1)$. As $n_1$ gets larger relative to $n_2$, fewer modes are lost. Therefore VHNA devices made according to the present invention should provide both enhanced bending loss and coupling efficiency characteristics as shown in FIGS. 7A and 7B from Sudo, et al, Applied Optics.

An optical device known as a "tunnel lens" uses the principal of total internal reflection to generate multiple images of a single object. Typically, it is very short in length and has application in multiplexing fiber-optic arrays and performing various optical computing tasks. The higher the index of refraction and, consequently, the numerical aperture, the more images can be generated in such a device. The same number of images could be generated with a shorter length of the VHNA material of the present invention.

By way of example and not limitation, biconvex, planoconvex, and rod lenses were prepared of lead-indium phosphate glass to assure that there were no unusual material characteristics that would prevent the use of this glass for traditional optical applications. Several cylindrical blanks of lead-indium-phosphate glass measuring 5.5 cm in diameter by 3 cm high were prepared, ground and polished into biconvex, plano convex and rod lenses, for example, that were designed with the aid of a ray-tracing program. No unusual fabrication problems were found and the material properties further indicate certain advantages to fabricating microlenses from the SCIN glass.

Imaging-light-guide bundles may be fabricated from a collection of the subject optical fibers. Such a coherent bundle should exhibit a higher efficiency because of the VHNA and hence be able to operate in environments with lower light levels than conventional fibers. Additionally, fused fiber-optic bundles, fused fiber-optic tapers and fiber-optic faceplates may be fabricated from the subject HNA optical fiber. These devices would have correspondingly high numerical apertures and would function to more efficiently transfer optical radiation. The previously noted advantageous material characteristics of SCIN glass would result in such devices having similarly advantageous uses over conventional fused-fiber devices.

HNA optical fibers are known to be of use in laser surgery and therapy applications.

Whereas an NA=0.4 is considered high for such situations, the present fibers surpass that value by a factor of more than 2. Transmission of infrared radiation is of growing interest to the laser community. The phosphate glasses transmit to about 3 microns and possibly more, depending on purity. Transmission with large efficiencies of even 50% through one meter of fiber at 2.94 microns would be a great advance over alternative fibers.

The VHNA optical fibers made according to the present invention are the only ones known to Applicants which can be useable for realistic laser and other light-source multiplexing as shown in FIG. 5. There are several advantages to multiplexing in this manner. Laser beams of differing wavelength may be launched into the fiber.

Pulsed laser beams arriving at different times may be injected into the fiber of the present invention thus increasing the effective power density (W/cm2) and fluence (J/cm2) handling capability of the fiber over conventional fibers which has application for medical laser and remote sensing.

While there has been shown and described what is, at present, considered the preferred embodiments of the invention, it will be obvious to those skilled in the art that various changes and modifications may be made therein without departing from the scope of the invention as defined by the appended claims.

What is claimed is:

1. A light transmitting device comprising:
    (a) at least one linear core material formed from a first glass composition having a first high index of refraction and a first linear thermal expansion coefficient and consisting essentially of lead oxide, phosphorus pentoxide and a third oxide selected from the group consisting of indium oxide or scandium oxide; and
    (b) a cladding material formed about each one of said linear core material from a second glass composition having a second index of refraction lower than said first index of refraction and a second linear thermal expansion coefficient approximately matching said first linear thermal expansion coefficient, said second glass composition comprising calcium oxide from about 41 to 43 wt percent, sodium oxide from about 9 to 11 wt percent and phosphorus oxide from about 46 to 48 wt percent and said second glass composition being doned with optically active ions to form an optical pump for said core glass material.

2. A very high numerical aperture optical fiber comprising:
    (a) a linear core material formed from a first glass composition having a first high index of refraction and a first linear thermal expansion coefficient and consisting essentially of lead oxide, phosphorus pentoxide and a third oxide selected from the group consisting of indium oxide or scandium oxide; and
    (b) a cladding material formed about said linear core material from a second glass composition having a second index of refraction lower than said first index of refraction and a second linear thermal expansion coefficient approximately matching said first linear thermal expansion coefficient, said second glass composition comprising calcium oxide from about 41 to 43 wt percent sodium oxide from about 9 to 11 wt percent, and phosphorus oxide from about 46 to 48 wt percent and said second glass composition being doped with optically active ions to form an optical sump for said core glass material.

\* \* \* \* \*